Figure 1:
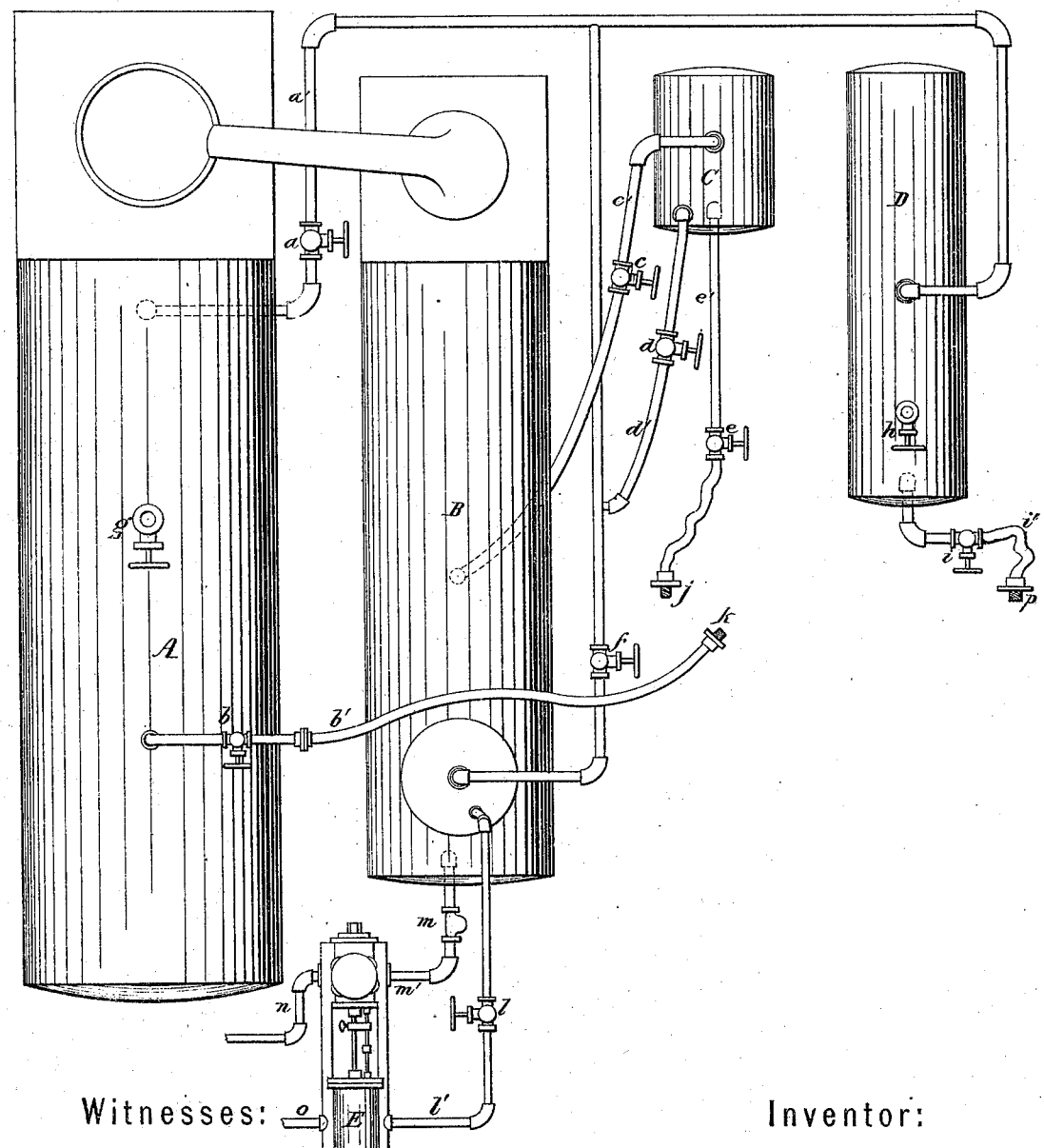

2 Sheets--Sheet 1.

EMILE LAMM.

Improvement in Chloride of Calcium Engines.

No. 124,594. Patented March 12, 1872.

2 Sheets--Sheet 2.
EMILE LAMM.
Improvement in Chloride of Calcium Engines.
No. 124,594. Patented March 12, 1872.
Fig. 3.
Fig. 2.
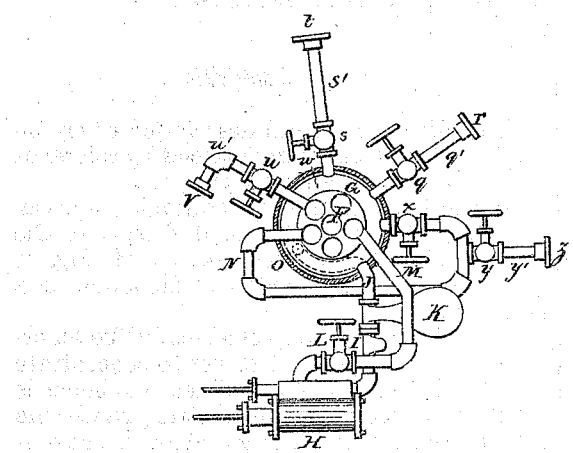
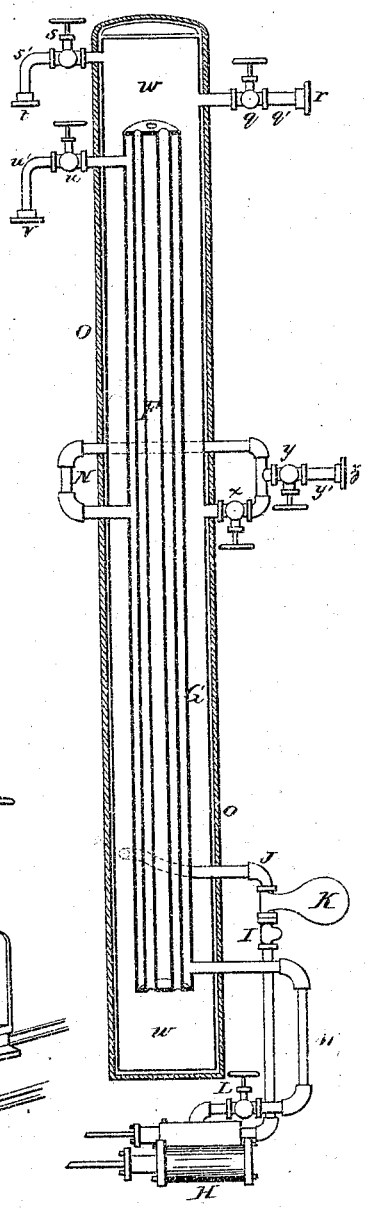
Fig. 4.
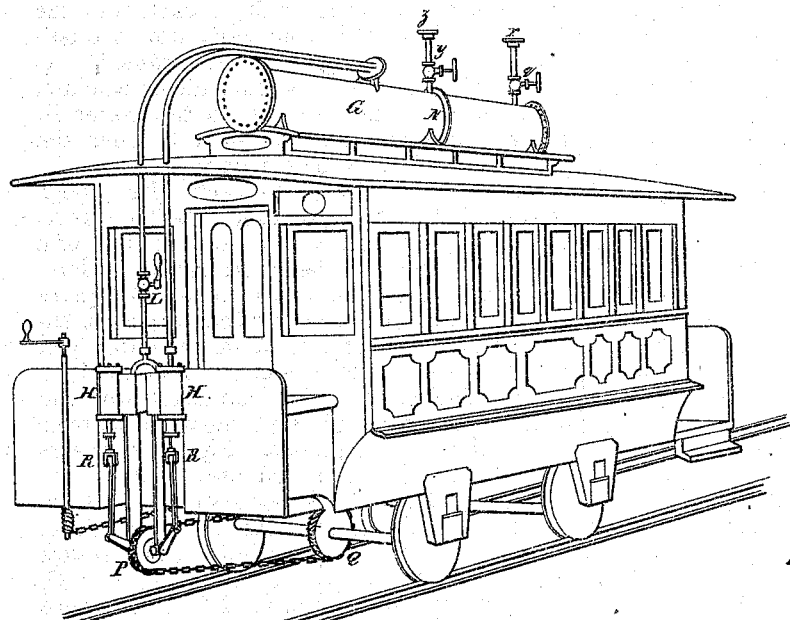
Witnesses: Inventor:
Emile Lamm 124,594

UNITED STATES PATENT OFFICE.

EMILE LAMM, OF NEW ORLEANS, LOUISIANA.

IMPROVEMENT IN CHLORIDE-OF-CALCIUM ENGINES.

Specification forming part of Letters Patent No. 124,594, dated March 12, 1872.

SPECIFICATION.

*To all whom it may concern:*

Be it known that I, EMILE LAMM, of the city of New Orleans, parish of Orleans, State of Louisiana, have invented a new and useful Chloride-of-Calcium Steam-Engine, of which the following is a full and exact description:

Objects of my Invention.

The first part of my invention relates to the use of superheated water, contained in a tubular iron vessel or generator, instead of liquefied gas, as the liquid whose vapor communicates motion to an engine, for the purpose of propelling street-cars or other vehicles without fire.

The second part of my invention relates to the use of concentrated chloride of calcium the boiling point of which is raised to 380° Fahrenheit, or more. It is then introduced at the above-named temperature into an iron tank, into which the steam-generator mentioned above is immersed. The steam-pipe of the engine is connected with the steam-generator, the exhaust-pipe being connected within and near the bottom of the tank. The exhaust steam is reabsorbed by the hot concentrated solution of chloride of calcium, and maintains the heat of the whole apparatus while the engine is working. The above phenomena of equilibrium of heat takes place owing to the fact that the latent heat taken away from the water by its own vapor returns to it as sensible heat by the condensation of steam in the chloride of calcium. Although the chloride of calcium seems to be the best ingredient for the within-stated purpose, there are a number of other substances well known to chemists possessing like affinities for reabsorbing water at a high temperature—for example, the hydrate of potassium and its carbonate, also many of the salts of sodium, &c. All these substances can be used instead of the chloride of calcium for the above-named purpose.

The third part of my invention relates to the description of the construction of a stationary apparatus intended for the preparation of superheated water, and the heating and concentration of the chloride of calcium combined with the charging and discharging of the motor at the start and end of each trip.

General Description.

The following general description of my invention will be easily understood by reference to the drawing and letters thereon.

Figure 1 is a plan of the stationary apparatus. Fig. 2 is a longitudinal section of the motor. Fig. 3 is a cross-section of Fig. 2. Fig. 4 is a perspective view of the motor on a street-car.

A in Fig. 1 is an iron vessel made like an ordinary steam-boiler. It serves to concentrate the chloride of calcium. When this boiler is heated the opening of the throttle $g$ causes the steam issuing from A to go off in the atmosphere. By closing it the pressure begins to take place in A. This pressure is made use of in charging the tank on the car. The pipe $b'$, ending in a rubber hose, has its end provided with a union-coupling, which, when it is connected at $s$, Fig. 2, serves to discharge the saturated solution from tank G back into the boiler A. Pipe $a'$ is connected from the bottom of boiler A to the charging-tank D. It serves to fill D with hot chloride of calcium. Pipe $f'$, connected from $a'$ to the boiler B, serves to create a pressure in B when the charge from D is to be driven in tank G, Fig. 2. The rubber hose $i'$ connects with pipe $g'$ when tank G is to be charged. Boiler B is an ordinary steam-boiler, made out of iron, of a strength sufficient to bear with safety one hundred and fifty pounds' pressure to the square inch. It is used mainly for the purpose of superheating the water used in generator F in Fig. 2. E is its feed-pump. It works by a steam attachment, and is connected with the steam-drum of boiler B in the usual manner well known to engineers. Pipe $c'$ connects with the bottom of B, and serves to fill the charging-tank C with superheated water from B. Pipe $d'$, connected with the steam-drum of B to the top of C, continues the pressure from the steam-boiler, whenever needed in C, by opening throttle-valve $d$. Its pressure becomes useful in charging the generator in Fig. 2. Pipe $e'$ is made to connect with F, Fig. 2, whenever F is to be charged with superheated water.

G, Fig. 2, is the tank containing the chloride of calcium previously heated to 380° Fahrenheit. F is the generator containing the superheated water. H is an ordinary steam-engine. It connects with the steam-generator in the usual well-known manner by means of pipe M. J is the exhaust-pipe, provided with a check-valve, lettered I, and an air-chamber, K, and dips in tank G to within one inch or two of its bottom. Pipe N serves to fill the generator with its charge of superheated water at the same temperature as the chloride of calcium, or thereabout. S' is the discharge-pipe for tank G, and g' is the charging-pipe for it. Figs. 3 and 4 explain themselves by glancing at them, and need not be further mentioned. O in Fig. 2 shows a border around tank G, which is a non-conducting substance surrounding the apparatus on the car. It is made of felt or any other convenient non-conductor. It diminishes the radiation of heat into the atmosphere from the machine.

I will now describe the working of the whole apparatus combined. To begin with, boiler A, Fig. 1, is filled to within two-thirds of its whole contents with chloride of calcium, which is heated until its boiling point has attained 380° Fahrenheit under atmospheric pressure. It being then concentrated, and a thermometer being thrust into the steam issuing therefrom, we obtain a mark not only of its temperature, but also of the degree or state of concentration it is in.

The apparatus on the car is first charged with superheated water. In doing this I begin by opening valve c in c', Fig. 2. The hot water from the boiler then rushes into the charging-tank C, which, when full, contains an ample but exact charge to enable the car to make a round trip from the station onward and backward. The charging-tank being filled, I close the valve in pipe C'; then connect the end of the rubber hose J with either v or z, Fig. 2; then open both valves in the connecting-pipe F' and d'; this causes the last portion of superheated water to rush in from C into F. It will be understood that during the time the charging takes place the valves opening communication between C and F are open.

The same process as the one just described is repeated in charging tank G with heated chloride of calcium. This explains itself clearly by looking at the drawing, without going over what would now be a repetition, with the following difference, viz.: As the car returns the superheated water in the generator F has been nearly expended during the trip, and is then found to be contained in the chloride of calcium, which has to be discharged from G into boiler A. To accomplish this rapidly the end of rubber hose K, Fig. 1, is connected to E, Fig. 2. The throttle-valve x in pipe N being then open a pressure is created on top of the solution in G, which rapidly drives the chloride of calcium into boiler A. Any water remaining still in the generator is let off by opening the valve.

I will now show where lies the usefulness and economy of my invention. A liquefied gas—like ammonia, for example—is nothing more but superheated liquid. This extra heat given to a liquid in a close vessel under pressure, by the atmosphere or fire, is not sufficient to work economically an engine; but to do so practically advantage must be taken, as in the case of ammonia, of the property it possesses of being reabsorbed by water at a temperature far above its boiling point under atmospheric pressure. It is this property which renders possible, as has been shown, the conversion of latent heat into sensible heat. I need not dwell upon the difficulties which ammoniacal gas presents for the within-described purpose. Such, for instance, is the complication of the machine in order to prevent all loss of gas. Further, it is far more economical within a certain medium to elevate the temperature of a body than to depress it. The above remarks being true, water and chloride of calcium are admirable substitutes for ammonia. The one of these substances can always be found at a nominal price, and the other, if it cost a little, it cannot be lost and diminished in quantity after it is once got, since it is not volatile. As to the difficulty of the radiation of heat into the atmosphere from the apparatus on the car, most of it can be easily avoided by covering with a non-conducting substance, since radiation operates much less rapidly upon a large mass than any one would suppose.

I claim as my own invention, and desire to secure by Letters Patent, the following:

1. I claim the combination of the water, either cold or superheated, with the heated chloride of calcium or its equivalent, in the manner described, and for the purpose set forth and specified.

2. I claim the process for concentrating the chloride of calcium and the manner of charging and discharging the apparatus on the car, as described and set forth.

3. I claim the use of all deliquescent salts in combination with superheated water, for the purpose set forth and specified.

EMILE LAMM.

Witnesses:
A. HÉRO, Jr.,
E. M. HUNT,
P. H. CONANT.